United States Patent
Theer et al.

[15] 3,656,842
[45] Apr. 18, 1972

[54] MOTION PICTURE CAMERA

[72] Inventors: Anton Theer, Munich; Johann Zanner, Unterhaching, both of Germany

[73] Assignee: AGFA-Gevaert Aktiengesellschaft, Leverkusen, Germany

[22] Filed: July 29, 1970

[21] Appl. No.: 64,102

Related U.S. Application Data

[63] Continuation of Ser. No. 699,691, Jan. 22, 1968.

[30] Foreign Application Priority Data

Jan. 26, 1967 Germany...............................A 54723

[52] U.S. Cl..................................................352/91
[51] Int. Cl. ....................................................G03b 21/36
[58] Field of Search.....................352/91, 172, 173, 175, 176

[56] References Cited

UNITED STATES PATENTS

| 3,425,776 | 2/1969 | Mayr.....................................352/175 |
| 3,145,613 | 8/1964 | Mueller.............................352/172 X |
| 3,246,944 | 4/1966 | Winkler...................................352/91 |

*Primary Examiner*—Samuel S. Matthews
*Assistant Examiner*—Monroe H. Hayes
*Attorney*—Michael S. Striker

[57] ABSTRACT

A motion picture camera wherein the supply reel need not or cannot be rotated by a motor in a sense to collect exposed film by drawing such film from the takeup reel. The motor which drives the takeup reel is reversible so that the takeup reel can be rotated in forward direction in order to draw unexposed film from the supply reel and also in reverse direction to pay out the film, for example, when the photographer wishes to reexpose a certain length of motion picture film. An arresting device which is controlled by a lever serving to set the motor for operation in forward or reverse is actuated when the motor is set for operation in reverse to arrest the drive for the takeup reel when the latter pays out a predetermined length of film. The film frame counter is arranged to prevent the lever from setting the motor for operation in reverse when a fresh film is inserted into the housing of the camera to thus prevent separation of film from the takeup reel.

12 Claims, 1 Drawing Figure

PATENTED APR 18 1972
3,656,842
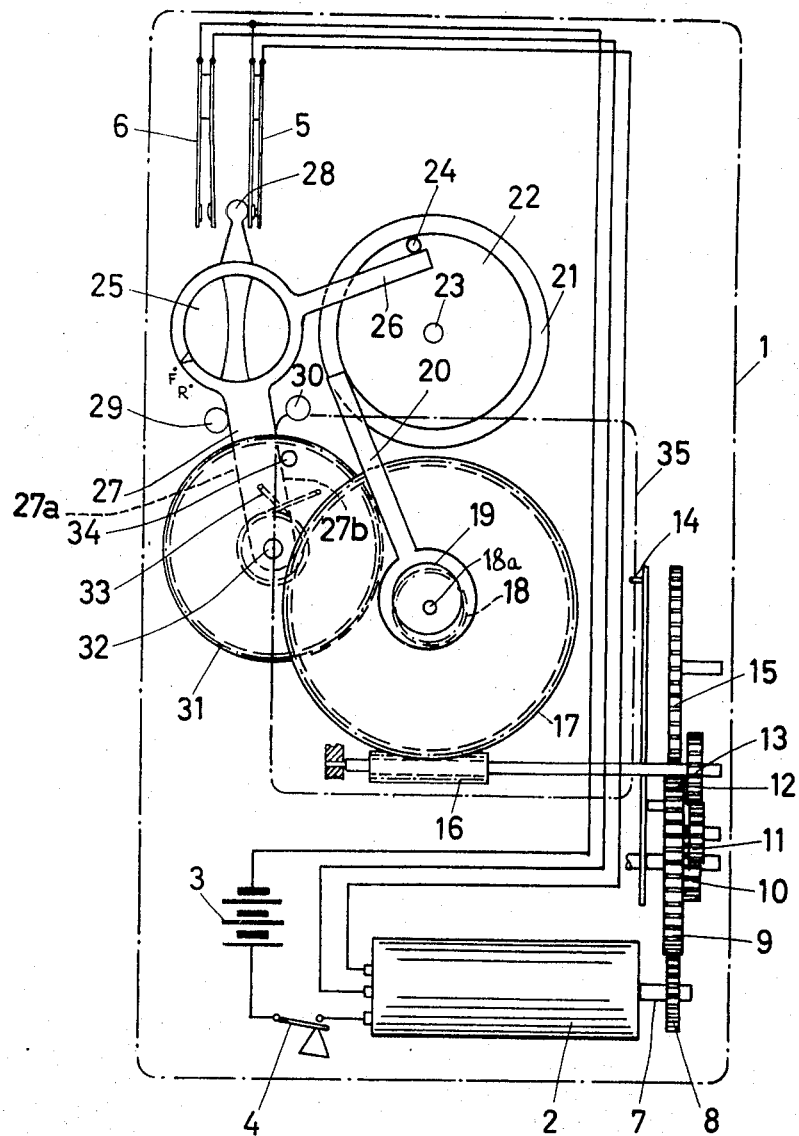
INVENTORS:
ANTON THEER
JOHANN ZANNER
BY Michael S. Strike,
Attorney

MOTION PICTURE CAMERA

This is a continuation of application Ser. No. 699,691, filed Jan. 22, 1968.

BACKGROUND OF THE INVENTION

The present invention relates to photographic cameras in general, and more particularly to improvements in motion picture cameras, especially to improvements in 8-millimeter cameras for use by amateur photographers.

Certain simple motion picture cameras or those which utilize magazines for 8-millimeter film are not provided with means for rotating the supply reel in a sense to collect exposed film by drawing the film off the takeup reel. Therefore, such cameras cannot be provided with means necessary in making so-called trick shots including repeated exposure of a portion of motion picture film. For example, many motion picture cameras utilize film which is stored in a cassette or magazine accommodating a takeup reel and a supply reel. The takeup reel is coupled with a motor when the magazine is properly inserted into the housing of the camera so that the motor can drive the takeup reel in a sense to draw unexposed film from the supply reel. When the film is fully exposed, the magazine is simply withdrawn from the housing and is sent or delivered to a developing or processing plant. Fresh magazines contain unexposed film which is convoluted on the supply reel and whose leading end is attached to the takeup reel.

SUMMARY OF THE INVENTION

It is an object of the invention to provide a simple motion picture camera wherein the supply reel need not be positively driven in a direction to draw exposed film off the takeup reel and which is nevertheless capable of permitting double exposure of selected portions of motion picture film.

Another object of the invention is to provide a motion picture camera of the just outlined character which is provided with a safety device serving to prevent detachment of film from the takeup reel during unwinding of film from such takeup reel.

In its simplest form, the camera of our invention comprises a housing, a driving member rotatable in the housing in two directions and arranged to transmit rotation to a takeup reel for motion picture film (e.g., through the intermediary of a friction clutch), reversible prime mover means operative to rotate the driving member, actuating means for setting the prime mover means for operation in forward and reverse directions to respectively rotate the driving member in a first direction in which the takeup reel collects the film by drawing it off the supply reel and in a second direction in which the takeup reel pays out the film so that the thus released portion of film is looped directly in the interior of the housing or in the interior of a magazine which contains the reels, and arresting means for terminating rotation of the driving member in second direction in response to a predetermined angular displacement of the driving member in second direction to thereby determine the length of that portion of film which is being paid out by the takeup reel.

The arresting means may include a pair of gears one of which rotates with the driving member or with a component of the prime mover means and the other of which is mounted on the actuating means, and a blocking device which limits rotation of the other gear. The other gear can be moved into mesh with the one gear when the actuating means sets the prime mover means for operation in reverse direction whereby the blocking device limits the extent of such rotation to determine the exact length of that portion of film which can be paid out by the takeup reel.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic side elevational view of a camera which embodies the invention.

DESCRIPTION OF THE PREFERRED EMBODIMENT

The drawing illustrates an 8-millimeter motion picture camera wherein the film transporting mechanism is set for forward operation, i.e., the film is to be drawn from the supply reel or spool and is to be convoluted onto the core of the takeup reel. The housing of the camera is indicated schematically at 1, and this housing accommodates a prime mover assembly including a reversible electric motor 2 connected in circuit with a source of electrical energy including one or more batteries 3, and with a master switch 4. Two control switches 5 and 6 are installed in such a way that one thereof is closed when the other is open, and vice versa. When the control switch 5 is closed simultaneously with master switch 4, the output shaft 7 of the motor 2 rotates in a sense to draw the film from the supply reel; this position of the control switch 5 is shown in the drawing. When the control switch 5 is open and the control switch 6 is closed simultaneously with closing of the master switch 4, the output shaft 7 rotates in the opposite direction to draw a length of the film from the takeup reel but the motor 2 does not rotate the supply reel in a sense to convolute the film thereon.

The prime mover assembly further includes a transmission here shown as a reversible gear train including gears 8-13, 16 and 17. The gear 8 is driven by the output shaft 7. The transmission drives a film transporting member here shown as a pulldown lever 14, and a rotary shutter 15. The gear 17 of the transmission rotates a driving member or shaft 18a which can rotate a takeup reel installed in a removable magazine or cassette 35. The driving member 18a can rotate the takeup reel by way of a conventional friction coupling, not shown. An eccentric 19 which is rigid with the driving member 18a cooperates with the strap of a connecting rod 20. The upper end of the connecting rod 20 cooperates with a resettable film frame counter assembly including an index wheel 21 which is connected to a disk-shaped counter wheel 22. The wheels 21 and 22 are mounted on a shaft 23. The connecting rod 20 can turn the index wheel 21 in a clockwise direction when it performs an upward stroke, as viewed in the drawing; when it moves downwardly, the connecting rod 20 is free to travel relative to the index wheel 21. The wheel 21 or 22 is provided with a locking projection 24 which can resemble a lobe or a tooth, and the wheels 21, 22 are biased by a spring which tends to return them to a zero position when the magazine 35 is withdrawn from the housing 1. A suitable pawl can cooperate with the wheel 21 or 22 to prevent backward (counterclockwise) rotation excepting when the pawl is intentionally disengaged prior or in response to withdrawal of the magazine 35.

The housing 1 of the motion picture camera further carries an actuating member 25 which is rotatable between two positions about a fixed axis and is manipulated when the user wishes to make trick shots. The actuating member 25 resembles a lever and has three arms 26, 27 and 28. When the control switch 5 is closed by the arm 28, i.e., when the prime mover assembly is set for forward operation, the arm 28 is remote from the control switch 6 so that the latter opens automatically and remains open until and unless the lever 25 is moved to a different position. When the housing 1 contains a freshly inserted magazine 35, namely, a magazine wherein the major part of motion picture film is stored on the supply reel so that only the leading end of the film is attached to the core of the takeup reel, the counter assembly 21–24 is in zero position and the aforementioned locking projection 24 on the wheel 22 extends into the path of movement of the arm 26. The arm 27 then abuts against a fixed stop 29 and is spaced from a second fixed stop 30. The arm 27 carries a gear 31 which forms part of an arresting unit for the driving member 18a and is turnable on a shaft 32. A torsion spring 33 is convoluted on the shaft 32 and operates between the arm 27 and gear 31. The latter carries an abutment or blocking member 34 in the form of a post or stud. A gear 18 which is rigid with the driving member 18a also forms part of the arresting unit and meshes with the gear 31 when the arm 28 of the actuating lever 25 closes the control switch 6.

As stated before, the drawing illustrates the parts of the camera in positions they assume when the motor 2 is ready to cause motion picture film to be unwound from the supply reel and to be convoluted on the takeup reel, the latter being coaxial with the gears 17, 18 and driving member 18a and receiving torque through the aforementioned friction coupling. The motor 2 is started in response to closing of the master switch 4 whereby the pulldown lever 14 transports the film by pulling it downwardly, as viewed in the drawing. The gears 17, 18 rotate in a clockwise direction and the member 18a drives the eccentric 19 which reciprocates the connecting rod 20. The upper end of the connecting rod 20 advances the wheels 21 and 22 by a step during each full revolution of the gears 17 and 18. The wheels 21, 22 then rotate stepwise in a clockwise direction.

If the user wishes to produce fadein or another trick shot which necessitates withdrawal of a relatively short portion of motion picture film from the takeup reel, the lever 25 is turned in a counterclockwise direction to allow the control switch 5 to open and to cause its arm 28 to close the control switch 6. Such turning of the lever 25 is possible only when a certain length of motion picture film is already convoluted around the core of the takeup reel, i.e., when the locking projection 24 is already moved away from the path of the arm 26. In other words, it is necessary that the connecting rod 20 index the wheels 21 and 22 one or more times before the locking projection 24 is advanced clockwise sufficiently to permit anticlockwise rotation of the actuating lever 25. The latter is arrested when the arm 27 abuts against the stop 30; the gear 31 then meshes with the gear 18. If the user thereupon closes the master switch 4, the output shaft 7 of the motor 2 drives the transmission 18-13, 16, 17 in a sense to rotate gear 18 and driving member 18a in a counterclockwise direction and the pulldown lever 14 is moved counter to its previous direction of movement so that it draws film off the takeup reel. The latter is driven by the driving member 18a through the intermediary of the aforementioned friction coupling. The gear 18 rotates the gear 31 in a clockwise direction whereby the torsion spring stores energy. Such clockwise rotation of the gear 31 is terminated automatically when the blocking projection 34 strikes against the left-hand arresting surface 27a of the arm 27, i.e., when the gear 31 completes nearly one full revolution. Thus, the blocking projection 34 determines with the arresting surface 27a the length of that portion of motion picture film which can be drawn off the takeup reel when the switches 4 and 6 are closed. The length of such film portion is selected with a view to make sure that the film portion can be readily accommodated in the magazine 35 without being actually convoluted on the supply reel and without undergoing any damage. The withdrawn portion of the film can form in the magazine 35 one or more loops.

The user thereupon returns the actuating lever 25 to the position shown in the drawing by turning it in a clockwise direction until the arm 27 reaches the stop 29. The gear 31 is disengaged from the gear 18 and the torsion spring 33 is free to dissipate energy. The control switch 5 is closed and the control switch 6 opens. When the spring 33 dissipates energy, the gear 31 rotates in a counterclockwise direction, as viewed in the drawing, and comes to a halt when the blocking projection 34 reaches the right-hand arresting surface 27b of the arm 27. The arm 26 then assumes a position in which it can cooperate with the locking member 24 on the wheel 22 to prevent movement of the arm 28 away from the control switch 5 when the counter assembly 21-24 is reset to zero position, i.e., when a fresh magazine 35 is inserted into the housing 1 or when a spent magazine is removed from the housing. The arm 26 then prevents rotation of the actuating lever 25 in a clockwise direction. The actuating lever 25 carries an index which registers with one of two graduations F and R on the housing 1 to indicate which of the control switches 5, 6 is closed.

The above described structure renders it possible to draw film off a takeup reel in cameras wherein the supply reel cannot be driven in a sense to collect the film, i.e., to draw exposed film off the takeup reel. Furthermore, the provision of the blocking projection 34 renders it possible to limit the length of motion picture film which is drawn off the takeup reel without any rotation of the supply reel so that the thus withdrawn length of film can be readily accommodated in the magazine without damage thereto and also without damaging that length which is convoluted on one or both reels. Still further, and as described above, the locking projection 24 can cooperate with the arm 26 of the actuating lever 25 in a sense to prevent withdrawal of film off the takeup reel when a fresh magazine is inserted into the housing 1, i.e., before the core of the takeup reel accommodates at least such a length of film which equals the length that is being withdrawn in response to closing of switches 4 and 6. This prevents the pulldown lever 14 from detaching the leading end of the film from the takeup reel.

Our invention is based on the recognition that the housing of a motion picture camera or a magazine for the supply and takeup reels normally contains enough empty space to accommodate a length of looped film without damaging the film, i.e., that a length of film can be stored in the housing or in the magazine without necessitating the provision of a drive which can rotate the supply reel in a sense to draw film off the takeup reel. This is particularly true if the length of that portion of film which must be paid out by the takeup reel for trick shots is not long. The pulldown lever 14 can be readily mounted and designed in such a way that it can draw the film from the supply reel or from the takeup reel in response to setting of the motor 2 for operation in forward or reverse. The locking projection 24 of the counter assembly 21-24 insures that the user of the camera need not remember whether or not the takeup reel already accommodates a sufficient portion of film before the motor 2 can be set for operation in reverse, i.e., the projection 24 prevents unintentional detachment of film from the core of the takeup reel.

The improved camera is susceptible of many modifications without departing from the spirit of the present invention. For example, the actuating lever 25 or a member which is movable therewith can be coupled with a diaphragm or the diaphragm can be adjusted by hand independently of the lever 25 so that the operator can reduce the aperture size during renewed exposure of a film portion or during initial exposure of that film portion which is to be drawn off the takeup reel for renewed exposure. Furthermore, the camera of our invention can also employ film which is not stored in a magazine or cassette as long as the supply spool is not driven and as long as there is enough room in the region adjacent to the reels to accommodate a certain length of film which is being drawn off the takeup reel but is not convoluted on the supply reel.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising a housing; a driving member rotatable in two directions and arranged to transmit rotation to a takeup device for motion picture film; reversible prime mover means operative to rotate said driving member, including reversible electric motor means having a rotary output member and transmission means connecting said driving member with said output member; actuating means for setting said prime mover means for operation in forward and reverse directions to respectively rotate said driving member in a first direction in which the takeup device collects the film and in a second direction in which the takeup device pays out the film; and arresting means for terminating the rotation of said driving member in said second direction in response to a predetermined angular displacement in said second direction to thereby determine the length of that portion of film which is being paid out by the takeup device, said arresting means comprising a first gear rigid with said driving member, a second gear mounted on said actuating means and meshing with said first gear when said actuating means sets said prime mover means for operation in said reverse direction, and blocking means for arresting said second gear in response to said predetermined angular displacement of said driving member in said second direction, said blocking means including a blocking member on said second gear and a pair of arresting portions on said actuating means, said blocking member being movable by said second gear away from one of said arresting portions and into engagement with the other arresting portion in response to rotation by said first gear, said actuating means comprising a lever which is turnable about a fixed axis between first and second positions in which it respectively sets said prime mover means for operation in said forward and reverse directions, said lever comprising an arm and said second gear being rotatably mounted on said arm, said arm further including said first and second arresting portions.

2. A combination as defined in claim 1, further comprising a pair of stop means provided on said housing to arrest said lever in said first and second positions thereof.

3. A combination as defined in claim 1, wherein said lever comprises a second arm and said prime mover means comprises a pair of control switches for said motor means, one of said switches being open when the other thereof is closed by said second arm and vice versa, whereby said motor means is respectively set for operation in said forward and reverse directions.

4. A combination as defined in claim 1, further comprising resettable counter means provided with locking means for arresting said lever in the first position thereof when said counter means is in a zero position.

5. A combination as defined in claim 4, wherein said counter means comprises a wheel driven by said prime mover means when the latter is set for operation in said forward direction and being moved to said zero position in response to withdrawal of the film from said housing so that said wheel remains in said zero position when a fresh film is inserted into said housing, said locking means comprising a projection provided on said wheel and extending into the path of movement of said lever from said first to said second position when said wheel stays in said zero position to thus insure that the prime mover means cannot be operated in said reverse direction immediately upon insertion of a fresh film into said housing.

6. A combination as defined in claim 5, wherein said projection is automatically moved away from the path of said lever in response to a predetermined angular displacement of said driving member in said first direction.

7. A combination as defined in claim 5, wherein said prime mover means further comprises an eccentric fixed to said driving member and a connecting rod driven by said eccentric and operative to intermittently rotate said wheel from said zero position in response to rotation of said driving member in said first direction.

8. In a motion picture camera, a combination comprising a housing; a driving member rotatable in said housing in two directions and arranged to transmit rotation to a takeup device for motion picture film; reversible prime mover means operative to rotate said driving member, comprising reversible electric motor means having a rotary output member and transmission means connecting said driving member with said output member; actuating means movable between first and second positions to respectively set said prime mover means for operation in forward and reverse directions and to thereby respectively rotate said driving member in a first direction whereby the takeup device collects the film and in a second direction whereby the takeup device pays out the film; arresting means for terminating the rotation of said driving member in said second direction in response to a predetermined angular displacement in said second direction to thereby determine the length of that portion of the film which is being paid out by the takeup device, comprising a first gear rigid with said driving member, a second gear mounted on said actuating means and meshing with said first gear when the actuating means sets said prime mover means for operation in said reverse direction, and blocking means for arresting said second gear in response to said predetermined angular displacement of said driving member in said second direction, said blocking means comprising a blocking member on said second gear and a pair of arresting portions on said actuating means, said blocking member being movable by said second gear away from one of said arresting portions and into engagement with the other arresting portion in response to rotation by said first gear; and locking means operatively connected with and movable by said prime mover means from a locking position in which it holds the actuating means in said first position while said driving member rotates in said first direction to a releasing position in response to collection of said portion of the film by takeup member.

9. A combination as defined in claim 8, further comprising means for biasing said blocking member toward engagement with said one arresting portion.

10. A combination as defined in claim 9, wherein said second gear is respectively disengaged from and meshes with said first gear in the first and second positions of said actuating means, said biasing means being free to return said blocking member into engagement with said one arresting portion in response to movement of said actuating means from said second to said first position.

11. A combination as defined in claim 9, wherein said biasing means comprises a spring operating between said actuating means and said second gear and arranged to store energy when said second gear is rotated by said first gear.

12. In a motion picture camera, a combination comprising a housing; a driving member rotatable in said housing in two directions and arranged to transmit rotation to a takeup device for motion picture film; reversible prime mover means operative to rotate said driving member, comprising reversible electric motor means having a rotary output member and transmission means connecting said driving member with said output member; actuating means movable between first and second positions to respectively set said prime mover means for operation in forward and reverse directions and to thereby respectively rotate said driving member in a first direction whereby the takeup device collects the film and in a second direction whereby the takeup device pays out the film; and arresting means for terminating the rotation of said driving member in said second direction in response to a predetermined angular displacement in said second direction to thereby determine the length of that portion of the film which is being paid out by the takeup device, comprising a first gear rigid with said driving member, a second gear mounted on said actuating means and meshing with said first gear when said actuating means sets said prime mover means for operation in said reverse direction, and blocking means for arresting said second gear in response to said predetermined angular displacement of said driving member in said second direction, said blocking means comprising a blocking member on said second gear and a pair of arresting portions on said actuating means, said blocking member being movable by said second gear away from one of said arresting portions and into engagement with the other arresting portion in response to rotation by said first gear.

* * * * *